United States Patent [19]
Lehmann

[11] Patent Number: 5,535,624
[45] Date of Patent: Jul. 16, 1996

[54] METHOD OF AND APPARATUS FOR CHECKING THE VOLUME OF CONTAINERS

[76] Inventor: Martin Lehmann, Obere Farnbuhlstr. 1, 5610 Wohlen, Switzerland

[21] Appl. No.: 241,698

[22] Filed: May 12, 1994

Related U.S. Application Data

[63] Continuation of Ser. No. 709,279, Jun. 3, 1991, abandoned.

[30] Foreign Application Priority Data

Jun. 2, 1990 [DE] Germany .................. 40 17 853.6

[51] Int. Cl.⁶ .................... G01F 17/00; G01F 11/28
[52] U.S. Cl. ........................................... 73/149
[58] Field of Search ........................... 73/149, 290 B

[56] References Cited

U.S. PATENT DOCUMENTS

| | | | |
|---|---|---|---|
| 2,168,106 | 8/1939 | Saur | 73/290 B |
| 3,402,602 | 9/1968 | de Castelet | 73/149 |
| 3,744,306 | 7/1973 | Krueger | 73/149 |
| 3,895,472 | 7/1975 | Steinhauer et al. | 52/743 |
| 3,895,519 | 7/1975 | Bouchy et al. | 73/149 |
| 3,962,916 | 6/1976 | Bouchy et al. | 73/149 |
| 4,354,383 | 10/1982 | Hoxtel | 73/290 B |
| 4,430,891 | 2/1984 | Holm | 73/149 |
| 4,553,431 | 11/1985 | Nicolai | 73/149 X |
| 4,640,122 | 2/1987 | Heroud et al. | 73/149 X |
| 4,720,995 | 1/1988 | Tkiel | 73/149 |
| 4,808,161 | 2/1989 | Kamen | 73/149 X |
| 4,852,415 | 8/1989 | Bogatzki et al. | 73/865.8 |
| 5,074,146 | 12/1991 | Orr et al. | 73/149 |

FOREIGN PATENT DOCUMENTS

| | | | |
|---|---|---|---|
| 0313678 | 5/1989 | European Pat. Off. | |
| 1931583 | 12/1970 | Germany | 73/290 B |
| 2534953 | 2/1976 | Germany | 73/149 |
| 3315238 | 10/1984 | Germany | |
| 75221 | 4/1986 | Japan | 73/149 |
| 251710 | 10/1986 | Japan | 73/149 |
| 235727 | 10/1986 | Japan | 73/149 |
| 499400 | 1/1939 | United Kingdom | 73/290 B |
| WO80/02196 | 10/1980 | WIPO | |

OTHER PUBLICATIONS

"Cheromatographie in der Gasphase" by Rudolf Kaiser—Bibliographisches Institut–Mannheim, 1961 pp. 42–43.
"Moderne Messmethoden Der Physik" by Franz X. Eder, Hochschulbucher fur Physik Herausgegben von Robert Rompe und Ernst Schmutzer—Band 1, 1968 p. 132.
Abstract of cited German patent 3, 315,238.
Abstract copyright 1985 by Derwent Publications, Ltd.

Primary Examiner—Thomas P. Noland
Attorney, Agent, or Firm—Antonelli, Terry, Stout & Kraus

[57] ABSTRACT

A method of checking a volume of containers wherein a gas is fed to the volume which is correlated to a volume of the container at a controlled flow rate such that, for example, the mass flow of the gas per unit of time is preset in a controlled manner such that it is possible to reduce the time periods during which it is necessary to await transient processes.

14 Claims, 2 Drawing Sheets

METHOD OF AND APPARATUS FOR CHECKING THE VOLUME OF CONTAINERS

CROSS REFERENCE TO RELATED APPLICATION:

This application is a Continuation Application of U.S. application Ser. No. 07/709,279 filed Jun. 3, 1991 and now abandoned.

FIELD OF THE INVENTION

The present invention relates to a method of checking the volume of containers in which a gas is fed into a volume which is correlated to the volume of a respective container and a signal which depends from the supplied amount of gas is evaluated as a signal indicative of the volume of the container.

The present invention also relates to an apparatus for checking the volume of containers by a source of pressurized gas in a connecting line extending from the source into a vessel of which the volume is correlated to the volume of the container to be checked.

The invention relates, furthermore, to a connector for containers.

DESCRIPTION OF THE PRIOR ART

The European Patent Specification EP-A-0 313 678 discloses a method in which, aside from the checking regarding the tightness of the containers, a signal is evaluated which depends upon the volume of the container being checked. A container to be checked is placed into a checking chamber wherein the volume difference between the checking chamber and the container to be checked forms a volume which depends from or is correlated, with respect to the volume of the container. This volume is acted upon by a pressurized gas from a pre-charged storage chamber by opening a valve arranged in a connecting line, and the ratio of the pressures ahead of the opening of the valve and after the opening of the valve provides an indication of the volume of the container, due to the compression of the pressure from the pre-charged chamber into the checking chamber.

The disadvantage of this method is that, due to the sudden decompression of the pressurized gas from the chamber into the checking chamber, relatively long time periods must elapse until transient processes of equalizing of the pressure have been damped, for example, caused at one side by the sudden decompression of the gas and the thereby occurring uncontrollable gas flow and at the other side by the time dependent yielding of the wall of the container to be checked.

It is additionally necessary, when proceeding from one checking to a subsequent checking to always recharge the chamber up to a preselected pressure before the subsequent checking can be initiated. This also increases the time period of a measuring cycle.

SUMMARY OF THE INVENTION

It is an object of the invention to provide a method and apparatus by which the time of a measuring cycle for checking a volume of containers can be considerably reduced.

A still further object of the present invention is to provide a method which encompasses the feeding of gas at a controlled flow into the volume which is correlated to the volume of the container.

Due to the fact that gas is fed to the volume which is correlated to the volume of the container at a controlled flow, i.e., the mass flow of the gas per unit of time is pre-set in a controlled manner, it is possible to drastically reduce the time period which must elapse in order to allow a relevant measuring in view of transient processes and, additionally, the provision of a chamber which must be pre-charged will become superfluous, whereby the checking by acting upon the mentioned volumes which are correlated to the volume of the container may be rapidly sequentially carried out without any preparing phase and without any loss of time.

For the checking of volumes of containers during a series or in line production of containers, for example, plastic containers, it is a further object of the invention to provide a method according to which gas is fed into the container itself by which the inner volume of the container acts as the above mentioned volume which is correlated to the volume of the container.

Yet a further object of the present invention is to provide a method wherein a time period until the pressure in the volume which is correlated to the volume of the container has reached a predetermined value is measured as an indicative signal, this obviously at a given mass flow of the gas fed to the mentioned volume during this time period.

By pre-setting the pressure value to be reached, the time consumed at each measuring cycle can be reduced further in that already, at a relatively small over pressure, the amount of gas which has until that time been fed to the mentioned volume is already relevant to the respective volume checked.

A further object of the present invention is to provide a method wherein the fed amount of gas until reaching a predetermined pressure or which amount thereof flows during a predetermined time span into the volume which is correlated to the volume of the container is measured.

Yet a further object of the present invention is to provide a method wherein the pressure, after a predetermined time period is measured.

A further object of the invention is to provide an apparatus of the aforementioned type in which the source is adapted to deliver a pre-settable amount of gas per unit of time.

Because the source delivers a pre-settable amount of gas per unit of time and no chamber is suddenly discharged into the volume to be checked by a step like opening of the valve, it will be basically possible to avoid transient processes such as appear at a sudden gas pressure discharge, and therefore to eliminate the time periods needed for the dampening of such processes. Furthermore, it is no longer necessary to have a storage source which is pre-charged to a predetermined pressure and including the previously necessary pre-charging time period. The vessel is thereby preferably formed by the container itself, and a connector is foreseen for a sealed connecting of the container to the connecting line. In this way it is possible to check one or more containers, such as, for example, plastic bottles during their in-line production and specifically not only by a random checking but, such as mentioned, all containers, coming from the production line and thereafter forwarded further.

A further object is to provide an apparatus which comprises a time measuring device and a pressure sensor of the vessel or at the connecting line, whereby the output of the pressure sensor is led to a comparator, which time measuring device is adapted to be started by an indicating signal of the comparator and is adapted to produce an output signal, which output signal is the output signal of the checking procedure.

Still a further object is to provide an apparatus which has a through flow rate measuring device arranged at the connecting line adapted such that its output, controlled by a time setting unit or by the output of a pressure comparator unit, is issued as an output signal of the checking procedure.

Yet a further object is to provide an apparatus including a pressure measuring device arranged at the vessel or at the connecting line of which the output signal, controlled by the time setting unit, is issued as an output signal of the checking procedure.

A further object is to provide an apparatus for simultaneous checking of a plurality of containers which additionally comprises a plurality of simultaneously operated connectors.

In the context which is here of interest, it must be borne in mind that in order to check the volume of containers, such as, for example, bottles, whereby the container is directly used as the vessel, the connections for feeding of gas must be adjusted to the respective possibly bulging shapes of the containers at the general area of their openings.

In order to obtain a large flexibility in this respect without a refitting and mounting respective suitable connections, it is a further object of the invention to provide a connector for containers which includes a connector casing having at least one connection for a line opening there into, and at least one pneumatically operated elastically flexible bellows located at the casing and adapted to apply the connecting within limits independently from the shape of the section of the container to be connected in a sealed state onto the outer wall of the container. Although such a connector can also be used for other processes such as, for example, the filling of containers, it is specifically used in combination with the inventive apparatus and generally for in-line bottle testing.

BRIEF DESCRIPTION OF THE DRAWINGS

The invention will be better understood and objects other than those set forth above will become apparent when consideration is given to the following detailed description thereof. Such description makes reference to the accompanying drawings wherein.

DESCRIPTION OF PREFERRED EMBODIMENTS

Figure 1A:
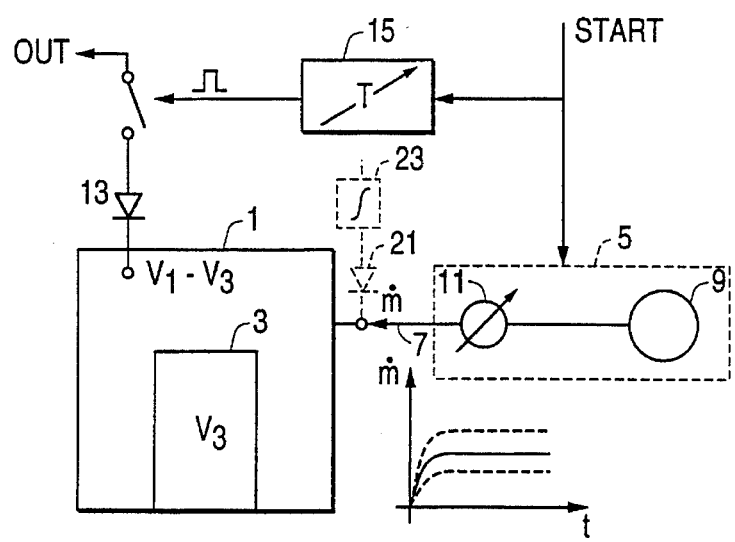
FIG. 1a is a schematic view of an apparatus constructed in accordance with the present invention, in which the volume which is correlated to the volume to be checked is taken as the volume of the checking chamber.

FIG. 1a schematically illustrates a checking chamber 1 wherein a closed container 3, possibly filled by its contents, is placed into the checking chamber 1. The setting of the container 3 to be checked and having a volume $V_3$ into the checking chamber 1, due to which the differential volume $V_1-V_3$ is produced in the chamber proceeds by a charging gate which can be closed in a completely sealed manner and is not particularly illustrated.

A source 5 of pressurized gas is connected via a connecting line 7 to the chamber 1. As shown in FIG. 1, the source 5 allows a controlled setting of the mass flow m of the gas which is fed per unit of time via the line 7 to the volume $V_1-V_3$, such as a setting to respective constant values. For this task and, by example, a storage tank 9 is provided for the pressurized gas and a control member 11 regulated by the through mass flow, such as, for example, a constantly adjustable valve.

This extremely simple volume testing apparatus operates in a manner described more fully hereinbelow with reference to FIGS. 1b–1e.

After the respective volume or container 3 to be tested is located in the checking chamber 1, the flow of a predetermined mass flow m of gas is set by the source 5 which is controlled regarding the mass flow in, for example, by the continuously adjustable valve 11. The pressure $P_{1-3}$ in the volume difference $V_1-V_3$ rises during the time period. This pressure is sensed by a pressure sensor 13.

Simultaneously, with the beginning of the operation for opening of the valve 11, a timing unit 15 is started which, after a pre-settable time period T, outputs or forwards further output of the pressure sensor 13 for further evaluation and thus an evaluation signal indicative of the checking.

Figure 1B:
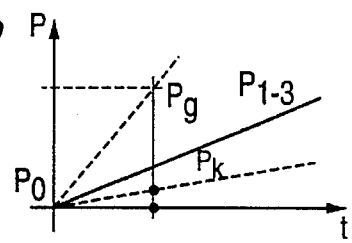
FIG. 1b is a graphical illustration, on a qualitative basis, of the course of the pressure in the checking chamber if a substantially constant mass flow of gas is fed there into for the explanation of an evaluation signal of a first variant.

According to the illustration of FIG. 1b, the pressure arriving in the checking chamber 1 with the volume difference $V_1-V_3$ after the pre-settable time period T will reach a higher value $P_g$ at a large volume $V_3$ and a lower value $P_k$ at a smaller volume $V_3$.

Thus, the pressure arriving in the differential volume or in the volume which is correlated to the volume $V_3$ to be checked after the pre-settable time period T, is evaluated as an evaluation signal for the volume test.

Figure 1C:
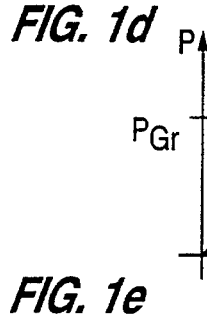
FIG. 1c is a schematic view of an alternative embodiment in accordance with the present invention.

According to a second variant of the evaluation, as illustrated in FIG. 1c, a predetermined and adjustable pressure value $P_{Gr}$ is set instead of a pre-set time period. To this end, as shown in FIG. 1c, the output of the pressure sensor 13 is connected to a comparator 17 and a signal S which corresponds to the pressure PGr is inputted as a reference value into the comparator 17. By this starting signal, which as explained by reference to FIG. 1a, the time counter 19 is started and then stopped by the output signal of the comparator 17, i.e., at the time when the pressure measured at the sensor 13 reaches a value S which corresponds to the pre-settable pressure threshold value $P_{Gr}$. The time value $\tau$ taken at the counter 19 is then evaluated as a volume indicating signal.

Figure 1D:
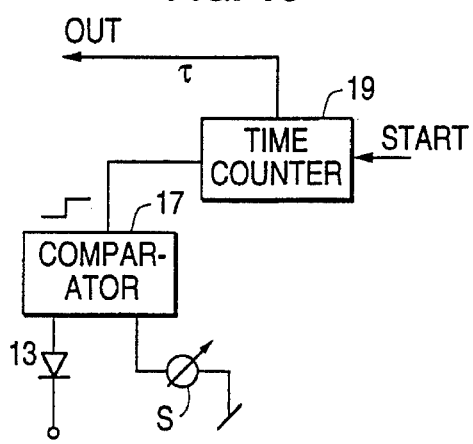
FIG. 1d is a graphical illustration similar to the graphical illustration of FIG. 1b for the explanation of a further variant of the preparation for the evaluation signal.

As shown in FIG. 1d, at a larger volume $V_3$ to be tested, the time period $\tau_g$ is shorter than in the case of a smaller volume tested where the time period such as illustrated qualitatively increases with $\tau_k$.

Figure 1E:
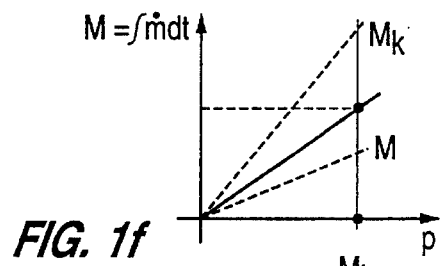
FIG. 1e is a graphical illustration of the mass of gas flow in correlation with the pressure in the gas chamber, for illustrating a further variant of the preparation for the evaluation signal.

FIG. 1e illustrates a further variant of preparing a checking signal. By a sensor 21, the amount of gas, the mass or volume, respectively, flow m fed per unit of time to the differential volume $V_1-V_3$ is measured and integrated at the integration unit 23 over the time period whereby the amount of gas which has flowed from the starting of the measuring cycle is detected.

Now, according to FIG. 1e, again a limit or threshold value $P_{Gr}$ is pre-set and the amount of gas is measured which has flowed from the start of the measuring cycle up to reaching this limit pressure. If the volume 3 to be checked is larger then the amount of gas $M_g$ which has flowed until reaching the limit pressure is smaller than in case of a smaller volume to be checked, such as illustrated by $M_k$. The reaching of the limit pressure $P_{Gr}$ according to FIG. 1e is achieved, for example, by a pressure sensor 13 and a comparator 17 switched in following the sensor 13 and by pre-setting the limit pressure Pot such as shown in FIG. 1c.

Figure 1F:
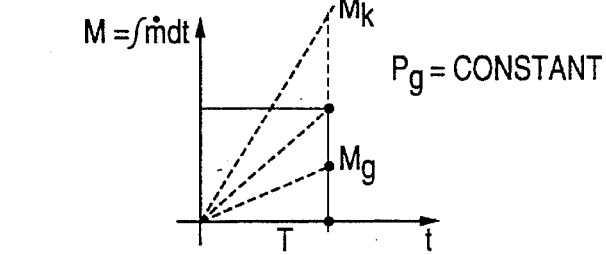
FIG. 1f is a graphical illustration of a relationship of the time axis to the mass of gas which has flown since the beginning of the measuring cycle for explaining a further variant of the preparation for the evaluation signal.

FIG. 1f illustrates a further variant of preparing an evaluation signal. A pre-set measuring period or cycle T is set and the amount of gas is measured which has flowed after the start of the measuring cycle. During the pre-set time period T, at a constant delivery pressure of the source 9 and at a delivered amount m per unit of time which, therefore, depends from the delivery pressure $P_g$ and the pressure in the differential volume, a lower amount of gas flows into the differential volume $V_1-V_3$ at a larger volume $V_3$ to be checked, such as illustrated schematically by $M_g$. Analogous thereto, at a smaller volume $V_3$ to be checked, the amount $M_k$ of gas which is fed within the time span T is larger.

The amount of gas which has flowed from the start of the measuring cycle is sensed, for example, again by the sensor 21 illustrated in FIG. 1a and the integrator 23 coupled at the output side thereof.

Figure 2:
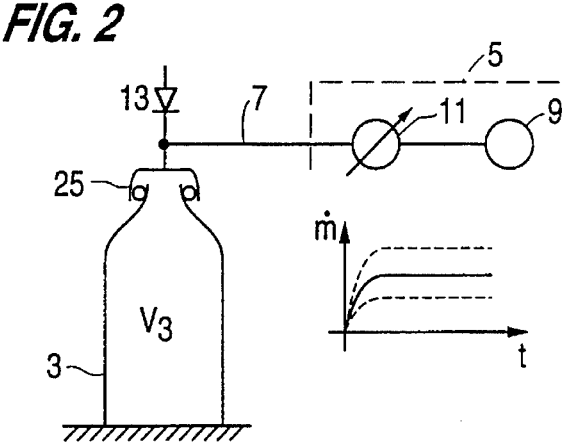
FIG. 2 is a schematic view analogous to FIG. 1a and of a variant of the embodiment of the inventive apparatus, in which the volume which is correlated to the volume to be checked is taken directly as the volume of a container to be checked.

In FIG. 2, the apparatus is analogous to the apparatus shown in FIG. 1a, when the volume which is correlated to the volume to be checked is formed directly by the inner volume $V_3$ of the container to be checked, such as, for example, a plastic bottle. Here the possibly installed pressure sensor of FIG. 1a is arranged directly at the delivery line 7 between a connector 25 for a tight sealed connecting of the line 7 to the opening of the container 3. In contrast to the variant of the embodiment of FIG. 1a, the container here is an open container such as a plastic bottle which just has been produced.

The procedure and the technique of evaluation remain the same, as explained in connection with FIG. 1a.

Figure 3:
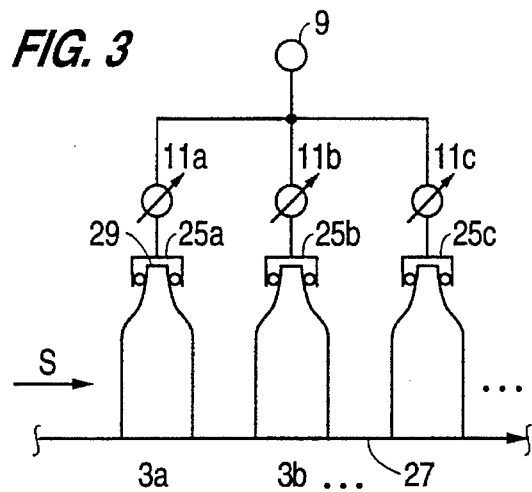
FIG. 3 is a schematic view analogous to the illustration of FIG. 2, depicting the checking of groups of containers arranged in-line during the production of the container.

A further technique such as schematically illustrated in FIG. 3 is extraordinarily advantageous and suitable for a checking of containers 3a, 3b, etc. which are supplied at a continuous in-line production fashion and just have been produced, whereby the checking of the volume is either made via flexible connections during the moving of the container, for example, on a conveyor belt 27, or when an intermittently driven conveyor belt or correspondingly driven conveyor apparatus is present, where one container or such as shown in FIG. 3, preferably, a plurality of containers, are simultaneously subjected to the volume testing.

Figure 4:
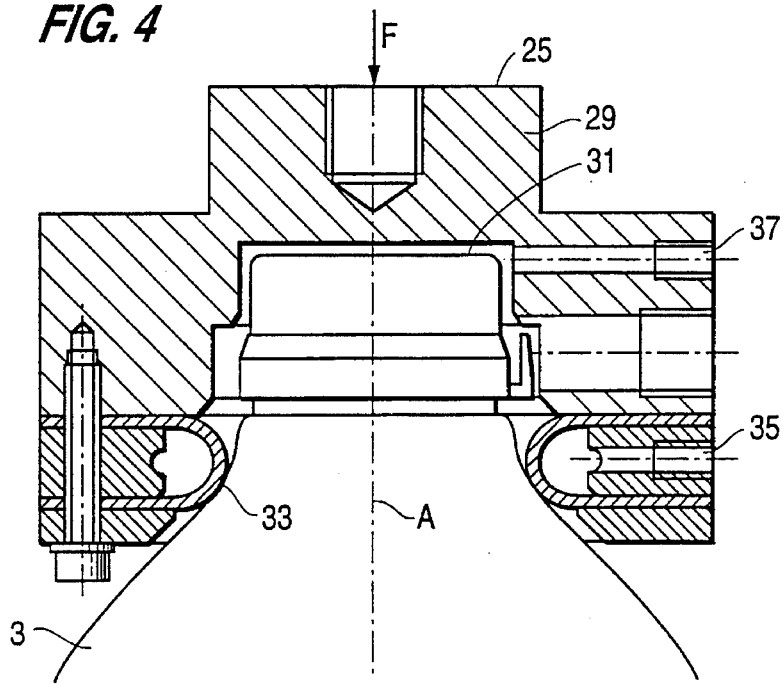
FIG. 4 is a partial longitudinal cross-sectional view through a connector for containers constructed in accordance with the invention, specifically also used in the embodiments of the invention according to FIGS. 2 and 3 for the inventive volume checking method and the inventive volume checking apparatus, respectively.

In order to solve at the procedures according to FIGS. 2 and 3, sealing difficulties in case of deviations of dimensions and shapes of the opening areas 29 of the containers to be controlled which may, for example, occur due to production tolerances or then in order to be able to control various containers at a production line without any adjusting procedures, it is suggested to construct the connector 25 according to FIGS. 2 and 3 in the manner illustrated in FIG. 4. Accordingly, a connector structured in accordance with the invention includes a casing 29, for example, of a metal or plastic, having a recess 31 for receiving the opening area of the container 3 to be checked, for example, a bottle neck of a plastic bottle.

A circumferentially extending bellows 33 is mounted at the lower area of the recess and coaxially to an axis A of the recess, which bellows 33 is made of a rubber elastic material, and conduits for a pressurized medium are located at one or a plurality of locations which open into the bellows. The pressurized medium is preferably a pressurized gas.

A connector in accordance with the invention further includes a supply line 37 which opens into the recess 31 and which is connected if the inventive connector is used for volume checking purposes according to FIGS. 2 and 3, to the gas feed connecting line 7.

By inflating the bellows 33, the connector 25 is placed at its lower area in a sealed manner onto the opening area or the bottle neck of the respective container 3 to be checked.

A tightly sealed seat is arrived at, within large limits independent of the specific bulging shape or dimension of this opening area. When applying the connector 25, it is preferred to apply a pressure F onto the connector 25 which pressure F is transmitted via the container 3 to be checked onto its respective supporting base such that, upon an inflating and sealed placing of the bellows 33 onto the outer small surface of the container 3 to be checked, no yielding in a direction of the axis A of the connector 25 or container 3 can occur.

According to the described procedure it is possible to make a volume checking of closed or open containers in that the evaluation signals illustrated in the drawings and described above may be, such as herein not specifically entered into but quite obvious to the person skilled in the art, be subjected in a further generally known procedure can be classified. Furthermore, depending upon whether the evaluation signals are too high or too low or too large or too small, a respective container which is checked is rejected as not acceptably large or not acceptably small.

By a controlling of the amount of gas fed per unit of time to the respective volumes, time periods which must pass within which one must wait for a pressure equalization until a relevant measuring is possible are no longer necessary.

By the connectors suggested in accordance with the invention it is possible to contact in a sealed manner containers having variously shaped or dimensioned opening areas within a larger range, such as bottle necks, and, for example, for filling the same or in connection with a checking of the volume in order to act upon the containers by means of a checking gas.

While there are shown and described present preferred embodiments of the invention, it is to be distinctly understood that the invention is not limited thereto, but may be otherwise variously embodied and practiced within the scope of the following claims. Specifically to be noted is that all claimed embodiments relating to the method and apparatus for checking singly checked containers are equally applicable for an in-line checking specifically of plastic bottles.

What is claimed is:

1. A method of reducing a measuring cycle time for checking volume of empty containers conveyed in a stream of containers so as to determine whether the volume of respective containers correspond to a rated volume, the method comprising the steps of feeding a gas into one of said empty containers, providing a signal dependent upon a supplied amount of gas, and evaluating said signal so as to provide an indication as to whether the volume of said one of said empty containers being checked corresponds to the rated volume, wherein the step of feeding of gas includes controlling a flow of the gas so as to provide a steady flow into the volume thereby avoiding a transient pressure behavior time span in said containers.

2. The method of claim 1, wherein a time period until the pressure in the volume of the container has reached a predetermined value is measured as said signal.

3. The method of claim 1, wherein either the supplied amount of gas up to reaching a predetermined pressure is measured as said signal or a time period up to reaching a predetermined pressure or the pressure reached after a predetermined time period is measured as said signal.

4. The method according to claim 1, wherein pressure of the gas after a predetermined time period is measured as said signal.

5. An apparatus for checking volume of containers, the apparatus comprising a source of pressurized gas, a connecting line extending from said source into a vessel of which the volume is correlated to the volume of the container to be checked, and means for controlling the source of pressurized gas so as to deliver a steady flow of a predeterminable amount of pressurized gas per unit of time so as to reduce a measuring cycle time.

6. The apparatus according to claim 5, wherein said container forms said vessel, and wherein at least one connector is provided for a sealed connection between the container and the connecting line.

7. An apparatus according to claim 6, wherein said at least one connector comprises a connector casing having at least one connection for a line opening thereinto and at least one pneumatically operated elastically flexible bellows located at said casing and adapted to apply said connector within limits independently of the shape of a section of the container to be connected in a sealed state onto an outer wall of said container.

8. The apparatus according to claim 5, further comprising a time measuring device and a pressure sensor at one of the vessel or at the connecting line, the pressure sensor having an output which is supplied to a comparator, wherein said time measuring device is adapted to be started by an initiating signal of the source of pressurized gas and to be stopped by an output signal of the comparator, and wherein said time measuring device is adapted to produce an output signal representing an output signal of a checking process.

9. The apparatus as claimed in claim 5, further comprising a pressure measuring device arranged at one of the vessel or at the connecting line, and a time setting unit for controlling said pressure measuring device, wherein an output signal of the pressure measuring device is a signal representing a checking process.

10. An apparatus according to claim 5, wherein said connecting line comprises a connector including a connection casing and at least one pneumatically operated elastically flexible bellows located at said casing and adapted to apply said connection within limits independently of a shape of a section of said container to be connected in a sealed state.

11. An apparatus for checking the volume of containers, the apparatus comprising a source of pressurized gas, a connecting line extending from said source into a vessel of which the volume is correlated to the volume of the container to be checked, means for controlling the source of pressurized gas so as to deliver a steady flow of a predeterminable amount of pressurized gas per unit of time, a throughflow rate measuring device arranged at the connecting line for providing an output signal, and one of a time setting unit or a pressure comparator unit for controlling said throughflow rate measuring device and being adapted to issue an output signal of a checking process.

12. An apparatus for checking the volume of containers, the apparatus comprising a source of pressurized gas, a connecting line extending from said source into a vessel of which the volume is correlated to the volume of the container to be checked, and means for controlling the source of pressurized gas so as to deliver a steady flow of a predeterminable amount of pressurized gas per unit of time, wherein said container forms said vessel, at least one connector is provided for a sealed connection between the container and the connecting line, and wherein a plurality of connectors are provided and are adapted to be simultaneously operated.

13. A method for a continuous checking of containers during production of the containers, the method comprising the steps of feeding a gas into a volume correlated to a volume of a respective container, providing a signal dependent upon the supplied amount of gas, and evaluating said signal so as to provide an indication of the volume of the container, wherein the step of feeding includes controlling the flow of the gas into the volume correlated to the volume of the container, thereby avoiding a transient pressure behavior time span in said container.

14. An apparatus for a continuous checking of containers during production of the containers, the apparatus comprising a source of pressurized gas, a connecting line extending from said source into a vessel having a volume correlated to a volume of the containers to be checked, and wherein said source of pressurized gas is adapted to deliver a predeterminable amount of gas per unit of time so as to avoid transient behavior within said vessel.

* * * * *